United States Patent
Honjo et al.

(10) Patent No.: US 10,907,584 B2
(45) Date of Patent: Feb. 2, 2021

(54) VAPORIZED FUEL TREATMENT DEVICE

(71) Applicant: MAZDA MOTOR CORPORATION, Hiroshima (JP)

(72) Inventors: Takuya Honjo, Utsunomiya (JP); Masanori Nishimura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/466,402

(22) PCT Filed: Nov. 16, 2017

(86) PCT No.: PCT/JP2017/041364
§ 371 (c)(1),
(2) Date: Jun. 4, 2019

(87) PCT Pub. No.: WO2018/105356
PCT Pub. Date: Jun. 14, 2018

(65) Prior Publication Data
US 2019/0293030 A1    Sep. 26, 2019

(30) Foreign Application Priority Data
Dec. 9, 2016  (JP) .................. 2016-239256

(51) Int. Cl.
*F02M 25/00* (2006.01)
*F02M 25/08* (2006.01)
*B60K 15/035* (2006.01)

(52) U.S. Cl.
CPC ..... *F02M 25/089* (2013.01); *B60K 15/03504* (2013.01); *F02M 25/08* (2013.01); *B60K 2015/03514* (2013.01)

(58) Field of Classification Search
CPC ................. F02M 25/089; F02M 25/08; B60K 15/03504; B60K 2015/03514
See application file for complete search history.

(56) References Cited

U.S. PATENT DOCUMENTS 4,805,581 A * 2/1989 Yamada ........... B60K 15/03504
                                                          123/519
5,456,237 A * 10/1995 Yamazaki .......... F02M 25/0854
                                                          123/519
(Continued)

FOREIGN PATENT DOCUMENTS

EP         2075451 A1    7/2009
JP       S57-080654 U1   5/1982
(Continued)

OTHER PUBLICATIONS

International Search Report issued in PCT/JP2017/041364; dated Jan. 16, 2018.

*Primary Examiner* — Phutthiwat Wongwian
*Assistant Examiner* — Sherman D Manley
(74) *Attorney, Agent, or Firm* — Studebaker & Brackett PC

(57) ABSTRACT

A vaporized fuel treatment device mounted on a vehicle includes a canister configured to adsorb and desorb fuel vaporized in a fuel tank; and a filter case having an air inlet through which air is introduced into the canister. The filter case houses a filter to purify the air. The canister and the filter case are arranged in a wheel well outer edge portion of the vehicle. The filter case is disposed outside with respect to the canister in a vehicle width direction.

5 Claims, 5 Drawing Sheets

1 :VAPORIZED FUEL TREATMENT DEVICE
2 :MAIN CANISTER
3 :FUEL TANK
10:SUBSIDIARY CANISTER
13:FILTER CASE
A :FLOOR PANEL
B :WHEEL WELL

(56) References Cited

U.S. PATENT DOCUMENTS

| | | | | |
|---|---|---|---|---|
| 5,477,836 | A * | 12/1995 | Hyodo | F02M 25/0854 123/519 |
| 5,592,922 | A * | 1/1997 | Denz | B60K 15/03504 123/520 |
| 5,868,428 | A * | 2/1999 | Ishikawa | B60K 15/03504 123/519 |
| 5,912,368 | A * | 6/1999 | Satarino | B01D 45/08 55/320 |
| 5,957,114 | A * | 9/1999 | Johnson | F02M 25/089 123/516 |
| 6,098,601 | A * | 8/2000 | Reddy | F02D 35/00 123/520 |
| 6,230,693 | B1 * | 5/2001 | Meiller | F02M 25/0854 123/519 |
| 6,896,852 | B1 * | 5/2005 | Meiller | B01D 53/0415 123/519 |
| RE38,844 | E * | 10/2005 | Hiltzik | B01D 53/02 123/519 |
| 7,059,306 | B2 * | 6/2006 | Reddy | F02M 25/0836 123/518 |
| 7,228,850 | B2 * | 6/2007 | King | B01D 53/0415 123/519 |
| 7,810,842 | B2 * | 10/2010 | Ichikawa | F02M 25/089 280/782 |
| 7,976,618 | B2 * | 7/2011 | Geurtz | B01J 20/28057 96/131 |
| 9,359,977 | B2 * | 6/2016 | Brock | F02M 25/0872 |
| 10,495,031 | B2 * | 12/2019 | Omichi | H05B 3/42 |
| 10,508,620 | B2 * | 12/2019 | Kuboyama | F02M 25/0836 |
| 2001/0015134 | A1 * | 8/2001 | Uchino | F02M 25/0854 96/130 |
| 2005/0223900 | A1 * | 10/2005 | Yoshida | F02M 25/0854 96/108 |
| 2007/0144497 | A1 * | 6/2007 | King | F02M 25/0854 123/519 |
| 2009/0159055 | A1 * | 6/2009 | Ohhira | F02M 25/089 123/519 |
| 2010/0206272 | A1 * | 8/2010 | Ishida | F02M 25/089 123/520 |
| 2011/0017069 | A1 * | 1/2011 | Murayama | B60K 15/03504 96/121 |
| 2015/0275727 | A1 * | 10/2015 | Hiltzik | F02M 25/089 123/519 |
| 2016/0312718 | A1 * | 10/2016 | Dudar | B60H 1/008 |
| 2016/0377032 | A1 * | 12/2016 | Kimoto | B60K 15/03504 123/519 |
| 2017/0050633 | A1 * | 2/2017 | Sato | B60K 6/46 |
| 2017/0190247 | A1 * | 7/2017 | Sharkar | B60K 15/067 |
| 2017/0226966 | A1 * | 8/2017 | Koga | F02M 25/0872 |
| 2018/0179992 | A1 * | 6/2018 | Morita | B62J 35/00 |
| 2018/0274490 | A1 * | 9/2018 | Honjo | F02M 25/0872 |
| 2018/0298852 | A1 * | 10/2018 | Honjo | B01D 53/047 |
| 2019/0300094 | A1 * | 10/2019 | Kurata | B62J 15/00 |

FOREIGN PATENT DOCUMENTS

| | | |
|---|---|---|
| JP | S63-162329 A | 7/1988 |
| JP | H08-246966 A | 9/1996 |
| JP | 2004-346801 A | 12/2004 |
| JP | 2008-261290 A | 10/2008 |
| JP | 2009-156032 A | 7/2009 |
| JP | 2009-162054 A | 7/2009 |
| JP | 5297361 B2 | 9/2013 |
| JP | 2015-117603 A | 6/2015 |
| WO | 2017/081911 A1 | 5/2017 |

* cited by examiner

1 : VAPORIZED FUEL TREATMENT DEVICE
2 : MAIN CANISTER
3 : FUEL TANK
10: SUBSIDIARY CANISTER
13: FILTER CASE
A : FLOOR PANEL
B : WHEEL WELL 16,17 :BRACKET
B1    :WHEEL WELL OUTER EDGE PORTION

11: AIR INLET
12: FILTER
13: FILTER CASE

VAPORIZED FUEL TREATMENT DEVICE

TECHNICAL FIELD

The present invention relates to a vaporized fuel treatment device for a vehicle, the treatment device adsorbing vaporized fuel that has been introduced from a fuel tank, desorbing the adsorbed fuel therefrom, and supplying the desorbed fuel to an engine together with air introduced through an air inlet. The present invention more particularly relates to a vaporized fuel treatment device configured to reduce entry of water through the air inlet.

BACKGROUND ART

To prevent air pollution, emissions of fuel vaporized in a fuel tank to the atmosphere have been controlled, and a vaporized fuel treatment device has been mounted on a vehicle to recover vaporized fuel. The vaporized fuel treatment device includes a canister configured to recover the vaporized fuel. The canister includes therein an internal passage that allows vaporized fuel and air to pass therethrough. The internal passage contains an adsorbent capable of adsorbing and desorbing the vaporized fuel. The canister has a tank port connected to the fuel tank, a purge port connected to an intake passage of an engine, and an air port connected to the air inlet. The tank port and the purge port are provided adjacent to one end of the internal passage. The air port is provided adjacent to the other end of the internal passage.

If, while the engine is off, vaporized fuel causes the fuel tank to have a predetermined internal pressure, the vaporized fuel is introduced through the tank port into the canister, and is adsorbed by the adsorbent while passing through the internal passage toward the air port communicating with the air inlet.

While the engine is on, the vaporized fuel that has been adsorbed by the adsorbent is purged. If the engine turned on causes the purge port to have a negative pressure, air is introduced through the air port into the canister. The introduced air passes through the internal passage of the canister, and is then supplied through the purge port to the intake passage of the engine while its flow rate is regulated by a purge valve. The vaporized fuel that has been adsorbed by the adsorbent is desorbed from the adsorbent due to the introduced air, is sent to the engine together with the air, and is combusted in a cylinder. In this way, the vaporized fuel treatment device purges, and treats, the vaporized fuel that has been adsorbed.

A canister is often attached to a lower side of a floor panel of a vehicle because of the vehicle layout, such that its internal passage extends horizontally. The air inlet is disposed above the canister in order that entry of water into the canister is prevented when the canister gets wet with water. For example, the air inlet is provided in a wheel well outer edge portion, which is a space defined in the wheel well by a fender liner. Air introduced from the air inlet is purified by a filter disposed in an air passage and capturing dust and other substances, and is then introduced through the air port into the canister.

A fender liner is used to prevent sand, water, and other substances raised by an associated tire from colliding directly with an associated wheel well, and is a synthetic resin member formed in the shape of an arch having a size that is larger than the outer diameter of the tire. The fender liner is coupled to the inner wall of the wheel well. This makes it difficult for water to enter the wheel well outer edge portion. However, a gap into and out of which air can flow is present, for example, at the boundary between the fender liner and the inner wall of the wheel well.

On the other hand, a canister of Patent Document 1 including a main canister and a subsidiary canister, for example, has been known to prevent vaporized fuel from being released to the atmosphere through an air port. This canister improves the desorption performance of the subsidiary canister communicating with an air inlet. This facilitates desorbing, during purging, the vaporized fuel that has been adsorbed, thereby recovering the adsorption capacity. Thus, emissions of the vaporized fuel to the atmosphere are reduced.

In addition, the present applicant has already proposed a canister including a first canister having an internal passage that extends horizontally, and a second canister having an internal passage that extends vertically (Japanese Patent Application No. 2015-220667). Through the use of a phenomenon in which vaporized fuel which has been absorbed moves downward by gravity, the second canister is disposed such that as the distance to an air inlet decreases, the concentration of the vaporized fuel that has been adsorbed decreases, thereby reducing emissions of the vaporized fuel to the atmosphere.

CITATION LIST

Patent Document

Patent Document 1: Japanese Unexamined Patent Publication No. 2015-117603

SUMMARY OF THE INVENTION

Technical Problem

However, even if the adsorption capacity of a portion of the canister near the air inlet is recovered and improved to reduce emissions of the vaporized fuel to the atmosphere, water entering the canister through the air inlet reduces the adsorption capacity, thereby making it difficult to obtain an expected advantage. Even if the wheel well outer edge portion is provided with the air inlet as described above, water may be splashed through the gap into the wheel well outer edge portion, or may flow along a member constituting the wheel well outer edge portion, to reach the air inlet, while the vehicle is washed using a high pressure washer. This may cause water to enter the canister through the air inlet.

The present disclosure provides a vaporized fuel treatment device that makes it difficult for water to enter a canister through an air inlet.

Solution to the Problem

The present disclosure relates to a vaporized fuel treatment device mounted on a vehicle. The vaporized fuel treatment device includes: a canister configured to adsorb and desorb fuel vaporized in a fuel tank; and a filter case having an air inlet through which air is introduced into the canister, the filter case housing a filter to purify the introduced air, the canister and the filter case being arranged in a wheel well outer edge portion of the vehicle. The filter case is disposed outside with respect to the canister in a vehicle width direction.

This configuration, in which the filter case having the air inlet is disposed in the wheel well outer edge portion above a floor panel, makes it difficult for the air inlet to get wet with water. Further, the filter case is disposed outside with respect to the canister in the vehicle width direction. This feature makes it difficult for water, which has entered the wheel well outer edge portion from inside in the vehicle width direction and which splashes in, and flows along, the wheel well outer edge portion, to reach the air inlet. As a result, the entry of water into the canister can be reduced.

The air inlet may be formed through a portion of the filter case, the portion located inside in the vehicle width direction.

This configuration can make it difficult for water, which has entered the wheel well outer edge portion from outside in the vehicle width direction and which splashes in, and flows along, the wheel well outer edge portion, to reach the air inlet.

The air inlet may be comprised of a plurality of slits that allow at least vertical communication therethrough.

This configuration can make it difficult for water splashing toward the air inlet to enter the filter case through the air inlet.

An upper portion of the filter case may be above the canister.

This configuration, in which the air inlet of the filter case is arranged in an upper portion of the wheel well outer edge portion, can make it difficult for water that has entered the wheel well outer edge portion to reach the air inlet. Further, the canister and the filter case can be arranged to conform to the shape of the wheel well outer edge portion.

The filter case may be coupled to the canister through a bracket, and the bracket may shield at least a portion of the air inlet from inside in the vehicle width direction.

With this configuration, the filter case is separated from a member constituting the wheel well. This feature can make it difficult for water flowing along the member constituting the wheel well to reach the air inlet. Further, the bracket receives a portion of water splashing from inside in the vehicle width direction toward the air inlet, thereby making it difficult for the water to reach the air inlet.

The canister may be disposed in a portion of a wheel well such that an internal passage of the canister extends vertically, the portion being near a rear of the vehicle.

With this configuration, the canister can be disposed in a space in the wheel well.

The vaporized fuel treatment device may further include: a main canister configured to adsorb and desorb the fuel vaporized in the fuel tank, the main canister being provided under a floor panel of the vehicle. The main canister may be disposed such that an internal passage of the main canister extends horizontally. The canister may be disposed such that an internal passage of the canister extends vertically.

With this configuration, the canister includes two separate canisters, i.e., the main canister disposed under the floor panel, and the other canister disposed in the wheel well. Thus, while the canister is disposed in a limited space in the wheel well outer edge portion, the capacity of the entire canister increases. This feature can improve the capacity with which the vaporized fuel treatment device adsorbs the vaporized fuel.

Advantages of the Invention

The vaporized fuel treatment device of the present invention makes it difficult for water to enter the canister through the air inlet.

DESCRIPTION OF EMBODIMENTS

Figure 1:
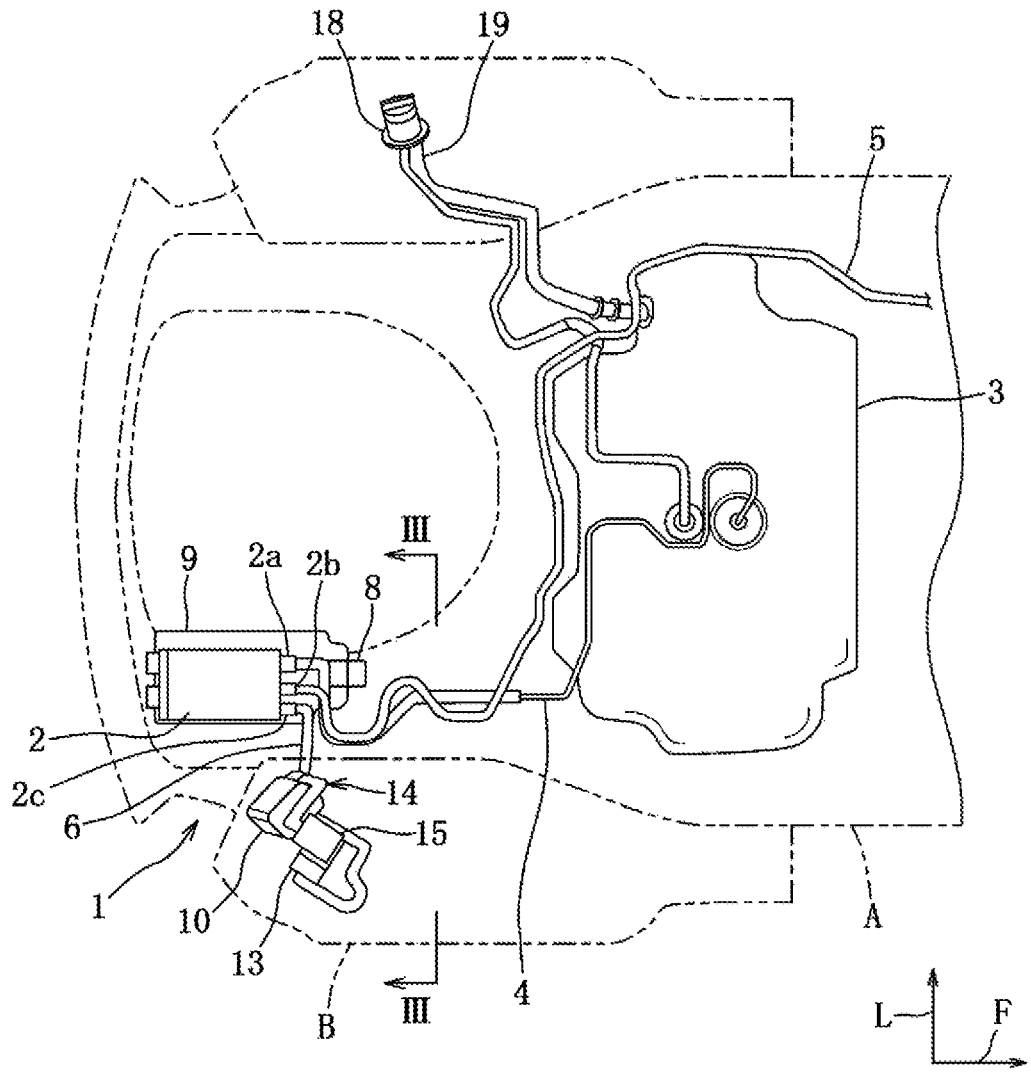
FIG. 1 is a plan view of a main portion of a rear of a vehicle including a vaporized fuel treatment device according to an example.

An embodiment of a vaporized fuel treatment device will now be described with reference to examples. In the drawings, the arrow F points the front, the arrow L points the left, and the arrow U points the upward direction.

First, an overall configuration of a vaporized fuel treatment device 1 will be described.

Figure 2:
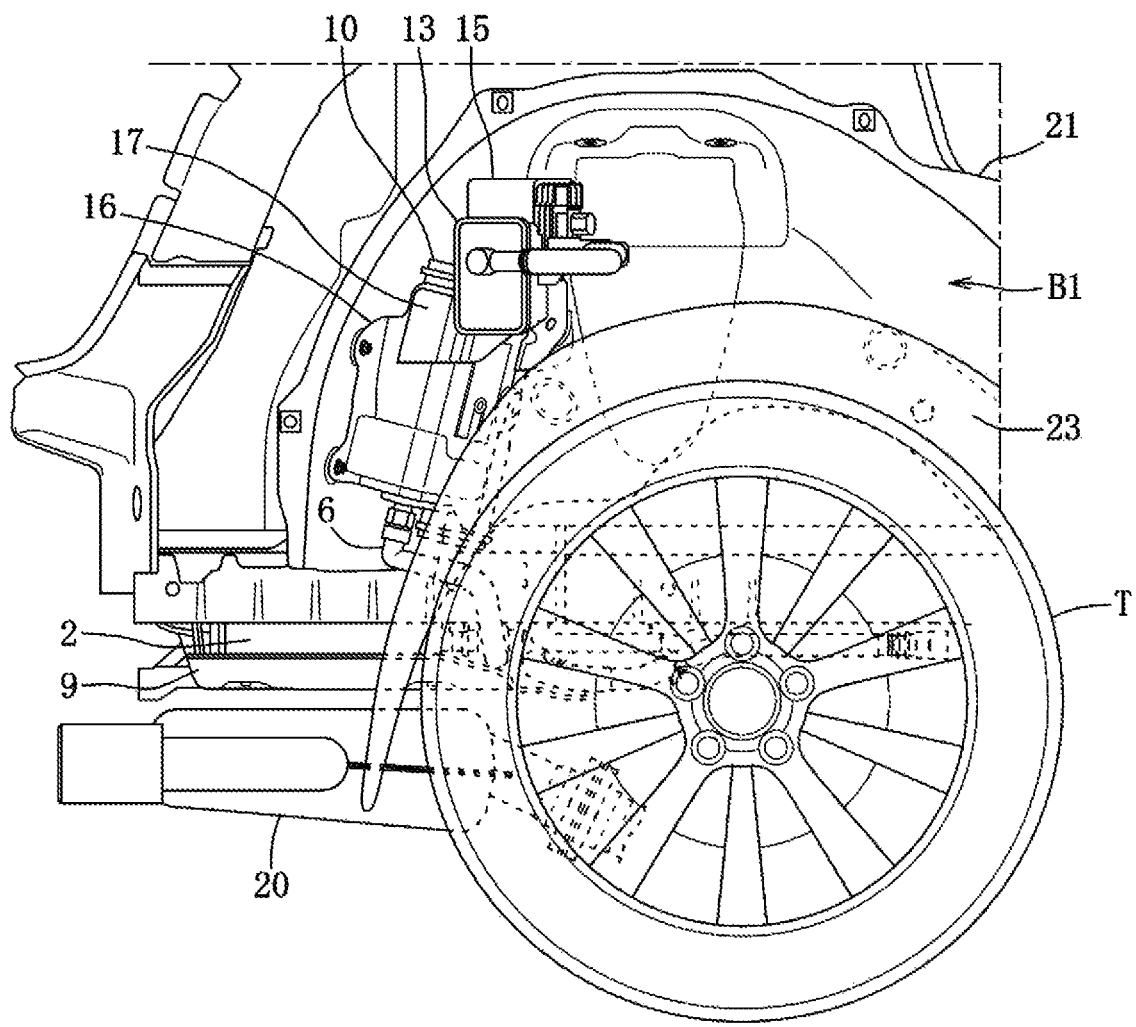
FIG. 2 is a right side view of a main portion of a rear of a vehicle including a vaporized fuel treatment device according to an example.
Figure 2:
Figure 3:
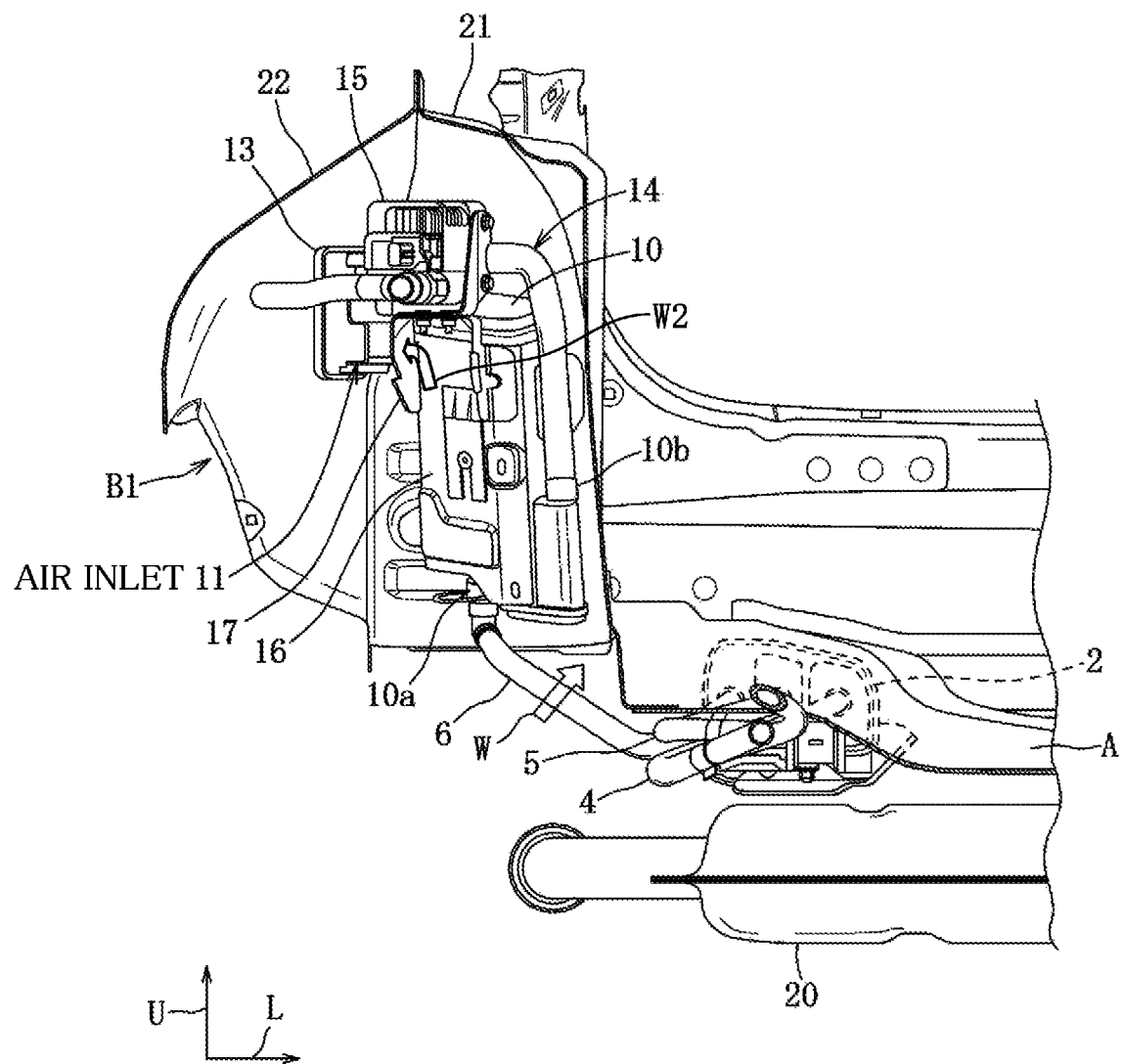
FIG. 3 is a cross-sectional view of the main portion taken along line shown in FIG. 1.

As shown in FIGS. 1 to 3, the vaporized fuel treatment device 1 is mounted on a rear of a vehicle. A main canister 2 and a fuel tank 3 are disposed under a floor panel A, and are connected to a tank passage 4, which connects the fuel tank 3 and a tank port 2a of the main canister 2 together.

The main canister 2 further has a purge port 2b and a communication port 2c. The purge port 2b is connected to a purge passage 5, which is connected to an intake passage (not shown) of an engine mounted on a front of the vehicle. The communication port 2c is connected to an inter-canister passage 6, which is connected to another canister (a subsidiary canister 10) disposed in a wheel well B for a right rear wheel. The subsidiary canister 10 is connected through an air passage 14 to a filter case 13 having an air inlet 11.

Next, the fuel tank 3 will be described.

The fuel tank 3 is a closed container made of a synthetic resin, and stores fuel supplied thereto through a fuel filler port 18 and a fuel supply passage 19. Although not shown, the stored fuel is supplied to the engine, and is combusted in a cylinder to generate power. If the stored fuel vaporizes to cause the internal pressure of the fuel tank 3 to exceed a predetermined pressure, vaporized fuel flows through the tank passage 4 toward the main canister 2.

Next, the main canister 2 will be described.

Although not shown, the main canister 2 includes therein an internal passage. To adsorb and desorb the fuel vaporized in the fuel tank 3, the internal passage contains an adsorbent comprised of, for example, pellets of activated carbon. The tank port 2a and the purge port 2b are provided adjacent to one end of the internal passage. The communication port 2c connected to the subsidiary canister 10 is provided adjacent to the other end of the internal passage. The internal passage of the main canister 2 of this example has a substantial U-shape in plan view. Specifically, the internal passage extends rearward from the tank port 2a and purge port 2b provided at the front end of the main canister 2, is turned back at the rear end of the main canister 2, and extends to the communication port 2c at the front end of the main canister 2. Alternatively, the internal passage may be linear, or may be turned back twice or more times.

The main canister 2 is disposed under the floor panel A such that its internal passage extends horizontally. The main canister 2 is fixed to the floor panel A through a bracket 8. A cover member 9 for preventing a flying stone and the like from colliding with the main canister 2 covers the bracket 8 and a lower portion of the main canister 2. A muffler 20 at the end of an exhaust pipe of the engine is disposed below the cover member 9, and is configured to facilitate desorbing the vaporized fuel that has been adsorbed by the main canister 2 through use of heat of an exhaust gas.

Next, the wheel well B will be described.

The wheel well B is a tire housing that covers a portion of a tire T except an outer portion of the right rear wheel in the vehicle width direction and a lower portion of the right rear wheel. The wheel well B has an arch shape in side view. The wheel well B includes: an inner member 21 that has an upper portion having an arch shape in side view and is provided inside in the vehicle width direction; and an arch-shaped fender member 22 coupled to an outer portion of the upper portion of the inner member 21 in the vehicle width direction. The wheel well B has an arch shape also as viewed in the vehicle width direction. An arch-shaped fender liner 23 of a synthetic resin partitions the wheel well B so as to shield the wheel well B from the tire T. A wheel well outer edge portion B1 is formed above the arch-shaped fender liner 23. FIG. 2 shows the interior of the wheel well outer edge portion B1 with the fender member 22 omitted. FIG. 3 shows the interior of the wheel well outer edge portion B1 with the tire T and the fender liner 23 omitted.

An inner end portion of the fender liner 23 in the vehicle width direction is coupled to the inner member 21, and an outer end portion thereof in the vehicle width direction is coupled to the fender member 22. Sand, water, and any other substances raised by the right rear wheel due to the travel of the vehicle collide with the fender liner 23, and hardly enter the wheel well outer edge portion B1. The same applies to wheel wells for a left rear wheel and right and left front wheels.

In the wheel well outer edge portion B1, provided are the subsidiary canister 10, the filter case 13 having the air inlet 11, and the air passage 14 connecting the filter case 13 and the subsidiary canister 10 together. A fault diagnostic system 15 for diagnosing a fault of the vaporized fuel treatment device 1 is disposed on the air passage 14.

Next, the subsidiary canister 10 will be described.

Just like the main canister 2, the subsidiary canister 10 includes an internal passage (not shown) containing an adsorbent for adsorbing and desorbing the fuel vaporized in the fuel tank 3. A communication port 10*a* is provided adjacent to one end of the internal passage, and an air port 10*b* is provided adjacent to the other end of the internal passage. The communication port 10*a* is connected to the inter-canister passage 6, and communicates with the main canister 2. The air port 10*b* is connected to the air passage 14, and communicates with the filter case 13. The air port 10*b* is turned back at the lower end of the subsidiary canister 10 to facilitate connecting the air passage 14 to the air port 10*b*.

The subsidiary canister 10 is fixed through a bracket 16 to an outer side wall of a rear portion of the inner member 21 in the vehicle width direction such that the internal passage extends vertically with the communication port 10*a* directed downward. The subsidiary canister 10 is disposed in a portion of the wheel well B near the rear of the vehicle. Since subsidiary canister 10 is fixed along the arch shape of the inner member 21, the internal passage of the subsidiary canister 10 may be inclined instead of being parallel to the vertical direction. In addition, in this example, the internal passage is turned back at the upper end of the subsidiary canister 10 to form a substantial U-shape turned upside down. However, the internal passage may be linear, or may be turned back twice or more times.

Next, the filter case 13 will be described.

Figure 4:
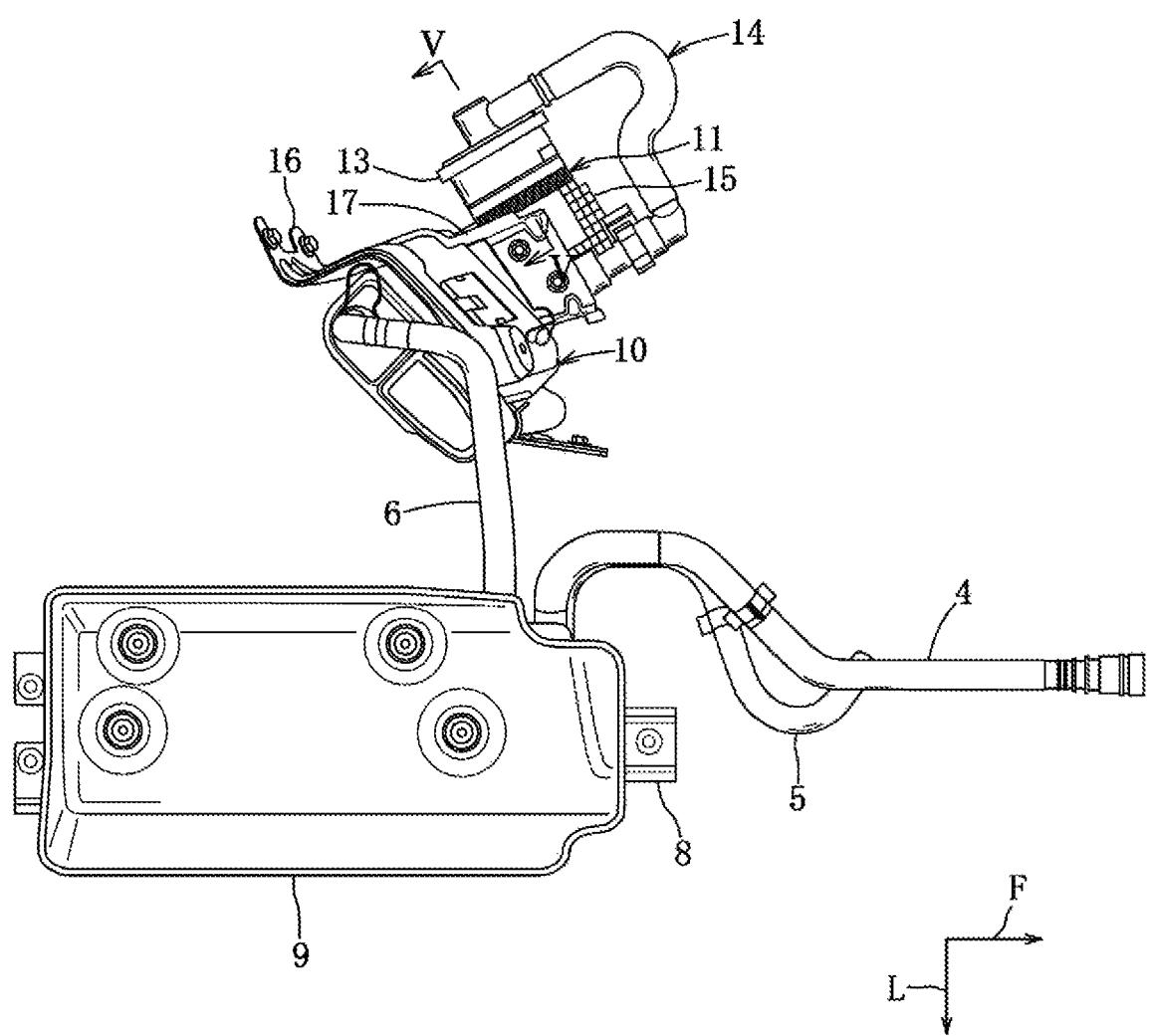
FIG. 4 is a bottom view of a vaporized fuel treatment device.

As shown in FIGS. 3 and 4, the filter case 13 is disposed outside with respect to the subsidiary canister 10 in the vehicle width direction, and is coupled through the bracket 16 and a bracket 17 to the subsidiary canister 10 so that an upper portion of the filter case 13 is above the subsidiary canister 10. The air passage 14 is connected to an outer portion of the filter case 13 in the vehicle width direction via the fault diagnostic system 15. The air inlet 11 is provided in a portion of the filter case 13, the portion located inside in the vehicle width direction. The air inlet 11 formed through the inside portion of the filter case 13 in the vehicle width direction has a portion shielded from inside in the vehicle width direction by the bracket 17.

Figure 5:
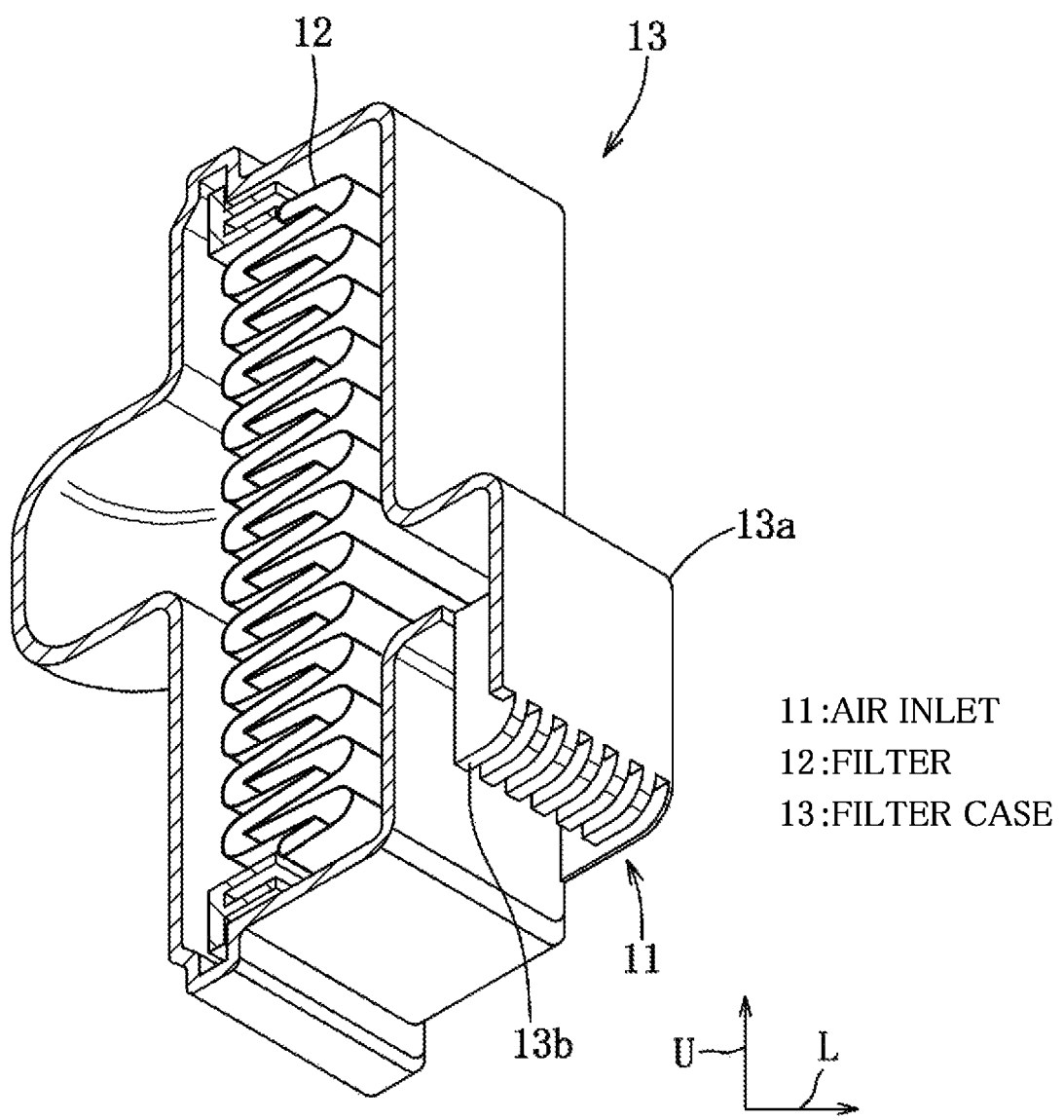
FIG. 5 is a sectional perspective view of the interior of a filter case, taken along line V-V shown in FIG. 4.

As shown in FIG. 5, a filter 12 is housed in the filter case 13. The filter 12 is folded into a pleated shape to catch dust and other substances in the air introduced through the air inlet 11 into the filter case 13. The air purified by the filter 12 flows through the air passage 14 toward the subsidiary canister 10. The air inlet 11 is comprised of a plurality of slits, which are cut in a lower portion of a protrusion 13*a* protruding inward in the vehicle width direction from an inside portion of the filter case 13 in the vehicle width direction, and which extend in the direction in which the protrusion 13*a* protrudes. The slits allow the inside and the outside of the filter case 13 to communicate with each other through the slits in vertical direction.

The plurality of slits constituting the air inlet 11 are separated from each other by a plurality of louvers such as louvers 13*b* formed integrally with the lower portion of the protrusion 13*a*. These louvers 13*b* or other suitable members extend downward from the lower portion of the protrusion 13*a*, and their inward end portions in the vehicle width direction are connected to the protrusion 13*a* except for their lower end portions. A space is formed between outward end portions of the louvers 13*b* in the vehicle width direction and the filter case 13. This space has upper, front, and rear ends defined by the protrusion 13*a* and opens downward. The space communicates with the inside of the filter case 13 through the slits.

Next, operations and advantages of the vaporized fuel treatment device 1 according to this example will be described.

The wheel well outer edge portion B1 of the vehicle includes the subsidiary canister 10, and the filter case 13 having the air inlet 11. The filter case 13 is disposed outside with respect to the subsidiary canister 10 in the vehicle width direction. The wheel well outer edge portion B1 is above the floor panel A of the vehicle, and is surrounded by the fender liner 23 and other members. This feature makes it difficult for water to enter the wheel well outer edge portion B1. The filter case 13 is disposed outside with respect to the subsidiary canister 10 in the vehicle width direction. This feature makes it difficult for water, which has entered the wheel well outer edge portion B1 from inside in the vehicle width direction and which splashes in, and flows along, the wheel well outer edge portion B1, to reach the air inlet 11. Furthermore, forming the air inlet 11 through an inside portion of the filter case 13 in the vehicle width direction makes it difficult for water, which has entered the wheel well outer edge portion B1 from outside in the vehicle width direction and which splashes in, and flows along, the wheel well outer edge portion B1, to reach the air inlet 11. As a result, the entry of water into the subsidiary canister 10 and the main canister 2 through the air inlet 11 can be reduced.

Since the air inlet 11 is comprised of the slits that allow at least the vertical communication therethrough, the louvers 13b and other members separating these slits from each other can substantially prevent water from entering, and splashing into, the wheel well outer edge portion B1 through the air inlet 11. This feature can make it difficult for the water to enter the filter case 13. As a result, the entry of water into the subsidiary canister 10 and the main canister 2 can be reduced.

Arranging the filter case 13 such that the upper portion of the filter case 13 is located above the subsidiary canister 10 makes it more difficult for water flowing along a member constituting the wheel well outer edge portion B1 to reach the air inlet 11. In addition, the subsidiary canister 10 and the filter case 13 can be arranged to conform to the shape of the wheel well outer edge portion B1.

The filter case 13 is coupled to the subsidiary canister 10 through the brackets 16 and 17. The bracket 17 shields at least a portion of the air inlet 11 from inside in the vehicle width direction. Thus, as indicated by the arrow W in FIG. 3, even if water that has once entered an inside portion of the wheel well outer edge portion B1 in the vehicle width direction from below the wheel well outer edge portion B1 splashes and is about to enter the air inlet 11 of the filter case 13, the water can be received by the bracket 17 (see the arrow W2). As a result, the entry of water into the canisters through the air inlet 11 is reduced.

Moreover, the main canister 2 adsorbing and desorbing the fuel vaporized in the fuel tank 3 is disposed under the floor panel A of the vehicle such that its internal passage extends horizontally. The subsidiary canister 10 is arranged such that its internal passage extends vertically. This feature allows the subsidiary canister 10 and the filter case 13 to be arranged in a limited space in the wheel well outer edge portion B1. In addition, the main canister 2 can have its adsorption capacity improved.

Next, a variation achieved through partial modification of the foregoing example will be described.

[1] The subsidiary canister 10 and the filter case 13 may be disposed in a wheel well outer edge portion for a left rear wheel or any one of right and left front wheels.

[2] The subsidiary canister 10 may be disposed on a side wall of a front portion of the inner member 21.

[3] In addition, various modifications may be made to the foregoing embodiment by a person skilled in the art without departing from the spirit of the present invention. The present invention encompasses such modifications of the foregoing embodiment.

DESCRIPTION OF REFERENCE CHARACTERS

1 Vaporized Fuel Treatment Device
2 Main Canister
3 Fuel Tank
10 Subsidiary Canister (Canister)
11 Air Inlet
12 Filter
13 Filter Case
15 Fault Diagnostic System
16, 17 Bracket
21 Inner Member
22 Fender Member
23 Fender Liner
A Floor Panel
B Wheel Well
B1 Wheel Well Outer Edge Portion

The invention claimed is:

1. A vaporized fuel treatment device mounted on a vehicle, the device comprising:
   a canister configured to adsorb and desorb fuel vaporized in a fuel tank; and
   a filter case having an air inlet through which air is introduced into the canister, the filter case housing a filter to purify the introduced air, the canister and the filter case being arranged in a wheel well outer edge portion of the vehicle, wherein
   the filter case is disposed outside with respect to the canister in a vehicle width direction,
   the air inlet is formed through a portion of the filter case, the portion located inside in the vehicle width direction,
   the filter case is coupled to the canister through a bracket, and
   the bracket shields at least a portion of the air inlet from inside in the vehicle width direction.

2. The vaporized fuel treatment device of claim 1, wherein the air inlet is comprised of a plurality of slits that allow at least vertical communication therethrough.

3. The vaporized fuel treatment device of claim 1, wherein an upper portion of the filter case is above the canister.

4. The vaporized fuel treatment device of claim 1, wherein the canister is disposed in a portion of a wheel well such that an internal passage of the canister extends vertically, the portion being near a rear of the vehicle.

5. The vaporized fuel treatment device of claim 1, the device further comprising:
   a main canister configured to adsorb and desorb the fuel vaporized in the fuel tank, the main canister being provided under a floor panel of the vehicle, wherein
   the main canister is disposed such that an internal passage of the main canister extends horizontally, and
   the canister is disposed such that an internal passage of the canister extends vertically.

* * * * *